(No Model.)

R. P. GORDON.
Revolving Stove Oven Shelf.

No. 242,302. Patented May 31, 1881.

Witnesses:
O. J. Bailey
T. O. Christian

Inventor:
Russell P. Gordon
by J. S. Zerbe
Atty.

United States Patent Office.

RUSSELL P. GORDON, OF MARTINSBURG, OHIO, ASSIGNOR OF ONE-HALF TO STEPHEN B. DODD, OF SAME PLACE.

REVOLVING STOVE-OVEN SHELF.

SPECIFICATION forming part of Letters Patent No. 242,302, dated May 31, 1881.

Application filed July 29, 1880. (No model.)

*To all whom it may concern:*

Be it known that I, RUSSELL P. GORDON, of Martinsburg, in the county of Knox and State of Ohio, have invented a new and useful Improvement in Revolving Stove-Oven Shelves, which improvement is fully set forth in the following specification and accompanying drawings, in which—

Figure 1:
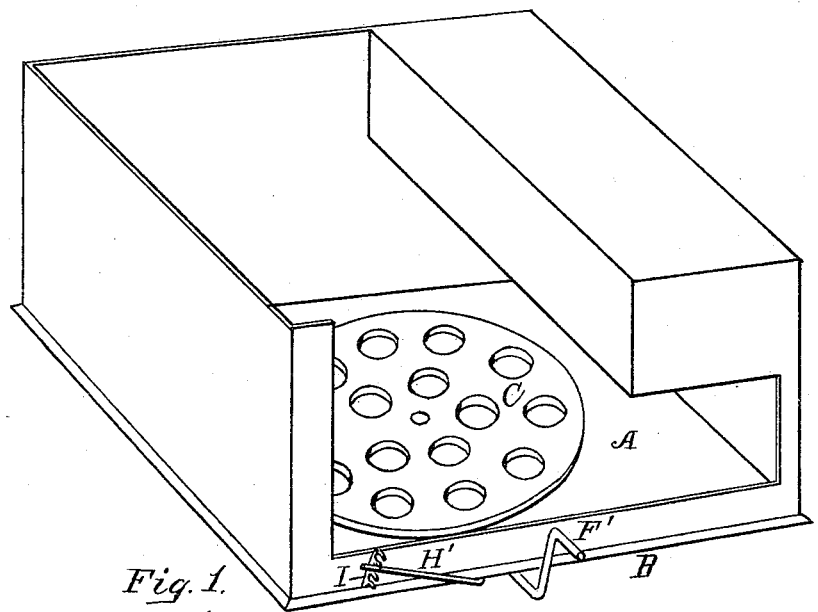
Figure 2:
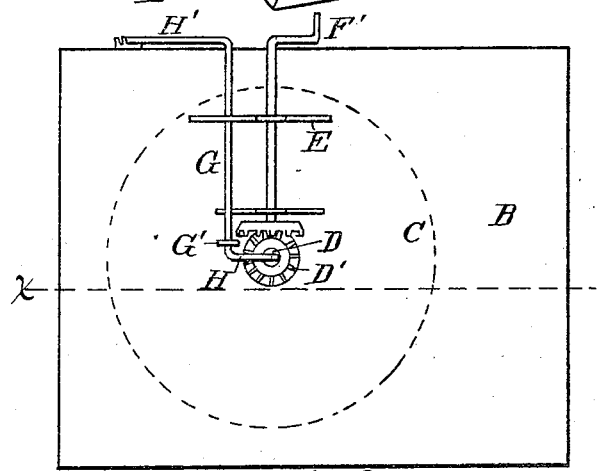

Figure 1 is a perspective view of the stove provided with the revolving baker. Fig. 2 is a bottom view of the same; and Fig. 3 is a vertical longitudinal sectional view through the line $x$ of Fig. 2, looking from the rear side.

It is the design in this invention to provide an attachment for a stove whereby the articles placed in the stove can be changed in position without opening the doors of the oven; and it consists in a suitable horizontally-disposed disk secured to a vertical shaft, which is journaled in the bottom of the stove, and, passing through said bottom, is provided on the lower end with a small pinion, which meshes with a larger pinion secured on a horizontal shaft. The outer end of this shaft has a crank, by means of which the disk within the oven is rotated at will. A horizontal shaft having on the inner end a right-angled extension serves as a support for the vertical shaft upon which the revolving disk rests, and a right-angled extension or crank on the outer end of this shaft engages with the teeth of a ratchet-bar, so that the disk within the oven can be elevated or lowered, as will be more fully set forth and explained by reference to the accompanying drawings and the letters of reference marked thereon.

In the drawings, A represents the floor of the oven, and B the base-plate of the stove.

Figure 3:
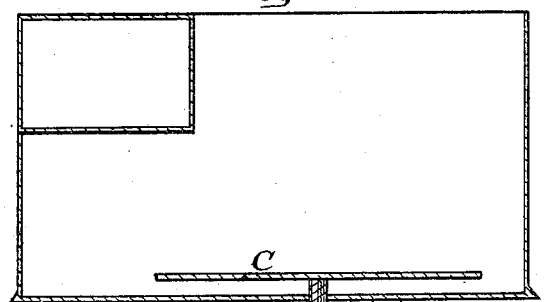

Centrally through the floor of the oven and the base-plate I form a perforation large enough to admit a vertical shaft, D, of sufficient length to project a slight distance above and below, as shown in Fig. 3.

On the upper end of the shaft D, within the oven, I secure thereto a disk, C, made of suitable metal. This is perforated throughout its entire face, or it may be cast in such form as to have radial arms, the main object being to form it in such a manner that when the vessels are placed on the disk C the heated air will readily strike the base of the vessels without interference by the disk. The lower end of the shaft is provided with a pinion, D', adapted to mesh with a larger pinion, F, which is secured to the inner end of a horizontal shaft, E, which is journaled by E' to the under side of the base-plate B. The outer end of the shaft E is provided with a crank, F', to be used for the purpose of revolving the disk C.

Journaled on the under side of the base-plate B to the pieces E' G', and extending parallel with the shaft E, is a rod or shaft, G. The inner end, H, of this rod is bent at right angles, and projects under the lower end of the vertical shaft D, which supports the disk C. The shaft and disk thus rest on the end H of the right-angled arm. The outer end, H', of the shaft G is also bent at right angles, and extends partly up alongside of the stove. At the end of this arm a ratchet-bar, I, is secured to the side of the stove, and the end H' engages in the notches thereof. The object of this shaft and arms is to provide a means whereby the quantity of heat can be regulated on the upper and lower sides of the vessels and contents, as well as the various sides, as is done by means of the revolving disk.

It is well known that the quantity of heat thrown out by the lower side of the oven and the upper side is often uneven, causing the food to be baked too hard either above or below. To obviate this the arm H' will readily enable the baker to adjust the height of the disk C so as to compensate for the inequality of the heat thrown out. In like manner, should the articles in the vessels receive too much heat on one side, the disk can be readily turned and a new surface exposed to the overheated side.

I am aware that a revolving stove-oven shelf is not new, nor do I claim this, broadly; but I am not aware that a revolving shelf in a stove has ever been constructed in such a manner as to be raised or lowered within the oven to compensate for the amount of heat above or below the shelf, as I have stated.

Having described my invention, what I claim as new, and desire to secure by Letters Patent, is—

In a stove, the combination of the verticallymovable revolving shaft D, passing through the bottom of the stove, having on the upper end a shelf, C, and on the lower end a pinion, D′, with the pinion F, shaft and crank F′, and with the shaft G, having the right-angled extensions H H′, for raising and lowering the shelf C, as herein set forth.

In testimony that I claim the foregoing I have hereunto set my hand this 5th day of July, A. D. 1880, in the presence of witnesses.

RUSSELL P. GORDON.

Witnesses:
 ANGIE MORGAN,
 DRUSILLA GORDON.